United States Patent

Frey

(10) Patent No.: US 9,766,365 B2
(45) Date of Patent: *Sep. 19, 2017

(54) COMPENSATED DEEP MEASUREMENTS USING A TILTED ANTENNA

(71) Applicant: Schlumberger Technology Corporation, Sugar Land, TX (US)

(72) Inventor: Mark T. Frey, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/525,075

(22) Filed: Oct. 27, 2014

(65) Prior Publication Data

US 2016/0116627 A1 Apr. 28, 2016

(51) Int. Cl.
*G01V 3/30* (2006.01)
*G01V 3/26* (2006.01)

(52) U.S. Cl.
CPC . *G01V 3/30* (2013.01); *G01V 3/26* (2013.01)

(58) Field of Classification Search
CPC .............. G01V 3/30; G01V 3/26; G01V 3/08
See application file for complete search history.

(56) References Cited

U.S. PATENT DOCUMENTS

| 5,594,343 | A | 1/1997 | Clark et al. |
| 5,757,191 | A | 5/1998 | Gianzero |
| 5,917,774 | A * | 6/1999 | Walkow ............... E21B 47/08 166/100 |
| 6,121,773 | A * | 9/2000 | Taicher ................. G01V 3/32 324/300 |
| 6,819,111 | B2 | 11/2004 | Fanini et al. |
| 6,911,824 | B2 | 6/2005 | Bittar |
| 6,969,994 | B2 | 11/2005 | Minerbo et al. |
| 7,915,895 | B2 | 3/2011 | Chemali et al. |
| 7,930,148 | B1 | 4/2011 | Figaro et al. |
| 7,990,153 | B2 | 8/2011 | Streinz et al. |

(Continued)

FOREIGN PATENT DOCUMENTS

| WO | 2013095997 A1 | 6/2013 |
| WO | WO2014003701 | 1/2014 |
| WO | WO2014003702 | 1/2014 |

OTHER PUBLICATIONS

International Search Report and Written Opinion issued in related PCT application PCT/US2015/057310 on Dec. 30, 2015, 8 pages.

*Primary Examiner* — Huy Q Phan
*Assistant Examiner* — Alvaro Fortich

(57) ABSTRACT

A method for making downhole electromagnetic logging while drilling measurements includes rotating an electromagnetic logging while drilling tool in a subterranean wellbore. The logging tool includes first and second transmitters, each of which includes a tilted antenna, and a receiver axially spaced apart from one another. Electromagnetic voltage measurements are made at the receiver while the tilted transmitting antenna in the first transmitter fires during tool rotation. The electromagnetic voltage measurements are mathematically rotated through at least the arbitrary angle to obtain rotated measurements, selected ratios of which are processing to compute gain compensated measurement quantities.

21 Claims, 4 Drawing Sheets

(56) References Cited

U.S. PATENT DOCUMENTS

| | | |
|---|---|---|
| 7,991,555 B2 | 8/2011 | Yang et al. |
| 8,159,227 B2 | 4/2012 | Wang |
| 8,195,400 B2 | 6/2012 | Wang |
| 8,274,289 B2 | 9/2012 | Bittar et al. |
| 8,294,467 B2 * | 10/2012 | Minerbo ................ G01V 3/28 324/343 |
| 8,466,683 B2 | 6/2013 | Legendre et al. |
| 8,536,871 B2 | 9/2013 | Li et al. |
| 8,626,446 B2 | 1/2014 | Dong et al. |
| 8,947,673 B2 | 2/2015 | Pahk et al. |
| 9,423,525 B2 | 8/2016 | Frey |
| 2003/0057950 A1 | 3/2003 | Gao et al. |
| 2003/0155915 A1 * | 8/2003 | Kruspe ................ G01V 3/32 324/303 |
| 2003/0184304 A1 * | 10/2003 | Homan ................ G01V 3/28 324/343 |
| 2006/0253255 A1 | 11/2006 | Omeragic et al. |
| 2007/0024286 A1 | 2/2007 | Wang |
| 2008/0078550 A1 | 4/2008 | Chatterji et al. |
| 2008/0078580 A1 | 4/2008 | Bittar |
| 2008/0143336 A1 * | 6/2008 | Legendre ................ G01V 3/28 324/339 |
| 2009/0015261 A1 * | 1/2009 | Yang ................ G01V 3/28 324/343 |
| 2009/0243618 A1 * | 10/2009 | Wang ................ G01V 3/28 324/338 |
| 2011/0088890 A1 * | 4/2011 | Clark ................ E21B 47/02216 166/66.5 |
| 2011/0140701 A1 * | 6/2011 | Legendre ................ G01V 3/28 324/339 |
| 2011/0238312 A1 | 9/2011 | Seydoux et al. |
| 2011/0291855 A1 | 12/2011 | Homan et al. |
| 2011/0309833 A1 * | 12/2011 | Yang ................ G01V 3/28 324/338 |
| 2012/0105076 A1 | 5/2012 | Li et al. |
| 2012/0217968 A1 | 8/2012 | Seydoux et al. |
| 2012/0242342 A1 | 9/2012 | Rabinovich et al. |
| 2012/0283951 A1 * | 11/2012 | Li ................ G01V 3/28 702/7 |
| 2012/0286790 A1 | 11/2012 | Yang et al. |
| 2012/0306500 A1 * | 12/2012 | Bittar ................ E21B 47/024 324/338 |
| 2013/0035862 A1 | 2/2013 | Fang et al. |
| 2013/0166213 A1 * | 6/2013 | Homan ................ G01V 3/30 702/7 |
| 2013/0191028 A1 | 7/2013 | Homan et al. |
| 2013/0301388 A1 | 11/2013 | Hartmann et al. |
| 2013/0304384 A1 | 11/2013 | Rabinovich et al. |
| 2014/0107929 A1 * | 4/2014 | Zhong ................ G01V 3/26 702/7 |
| 2014/0195188 A1 * | 7/2014 | Donderici ................ G01V 1/48 702/103 |
| 2015/0276972 A1 | 10/2015 | Frey |
| 2016/0209540 A1 | 7/2016 | Frey et al. |

* cited by examiner

COMPENSATED DEEP MEASUREMENTS USING A TILTED ANTENNA

CROSS REFERENCE TO RELATED APPLICATIONS

None.

FIELD OF THE DISCLOSURE

Disclosed embodiments relate generally to downhole electromagnetic logging and more particularly to a method and apparatus for making fully gain compensated deep propagation measurements, such as phase shift and attenuation measurements, using both tilted and orthogonal antennas.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements are commonly inverted at the surface using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently significantly more complex than the formation models used in the inversion. The use of a three-dimensional matrix of propagation measurements may enable a full three-dimensional measurement of the formation properties to be obtained as well as improve formation imaging and electromagnetic look ahead measurements. Tilted antennas may be used to reduce the number of required electromagnetic measurements to acquire a three-dimensional measurement of the formation properties. However, there are no known methods for providing fully gain compensated three-dimensional measurements using tilted antennas.

SUMMARY

A method for making downhole electromagnetic logging while drilling measurements is disclosed. An electromagnetic logging while drilling tool is rotated in a subterranean wellbore. The logging tool includes first and second transmitters and a receiver axially spaced apart from one another. The receiver includes an axial receiving antenna and first and second transverse receiving antennas. The first transmitter includes a tilted antenna and the second transmitter includes a tilted antenna and first and second transverse transmitting antennas. The first and second transverse transmitting antennas are rotationally offset by a predefined angle from the first and second transverse receiving antennas. A projection of the tilted antenna in the first transmitter on a cross-axial plane is rotationally offset by an arbitrary angle from the first transverse receiving antenna. Electromagnetic voltage measurements are made at the receiver while the tilted transmitting antenna in the first transmitter fires during tool rotation. The electromagnetic voltage measurements are mathematically rotated through at least the arbitrary angle to obtain rotated measurements, selected ratios of which are processing to compute gain compensated measurement quantities.

The disclosed embodiments may enable a three-dimensional tensor of gain compensated deep electromagnetic measurements to be acquired using tilted antennas. Moreover, certain of these measurements tend to be insensitive to the tilt angle and tilt angle variations in the tilted antennas.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
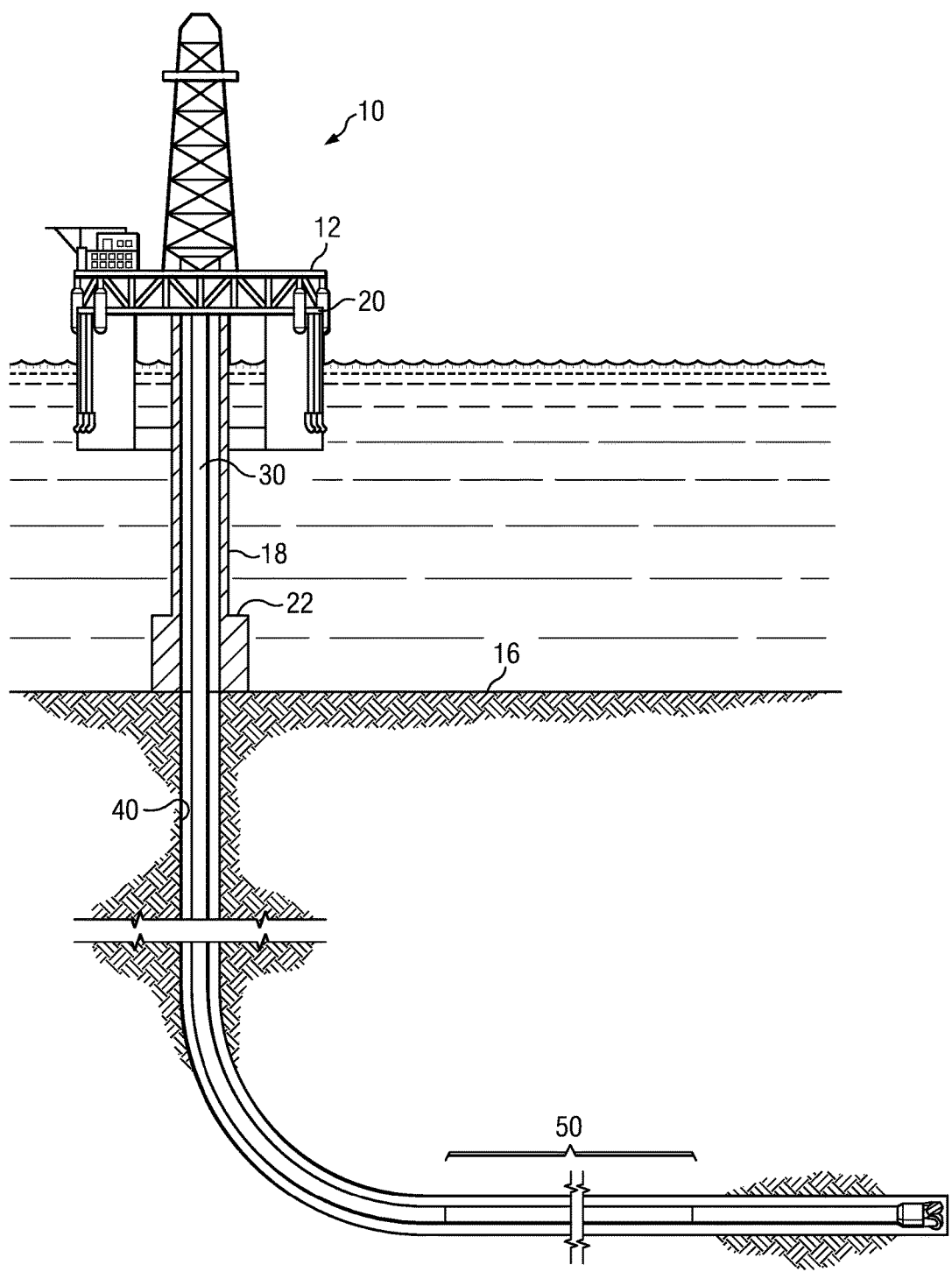
FIG. 1 depicts one example of a drilling rig on which the disclosed electromagnetic logging tools and methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes a deep reading electromagnetic measurement tool 50 configured to make tri-axial electromagnetic logging measurements. As described in more detail below the deep reading electromagnetic measurement tool 50 may include multiple orthogonal antennas deployed on at least first and second axially spaced subs.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
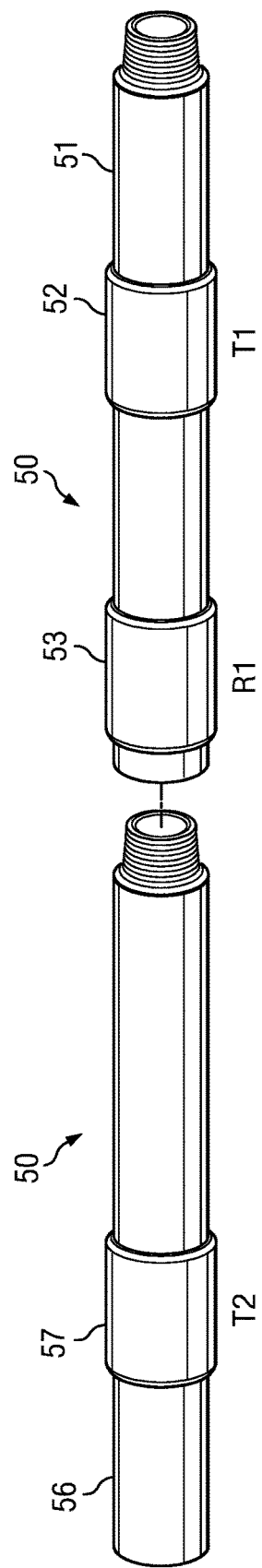
FIG. 2A depicts one example of the deep reading electromagnetic logging tool shown on FIG. 1.
Figure 2B:
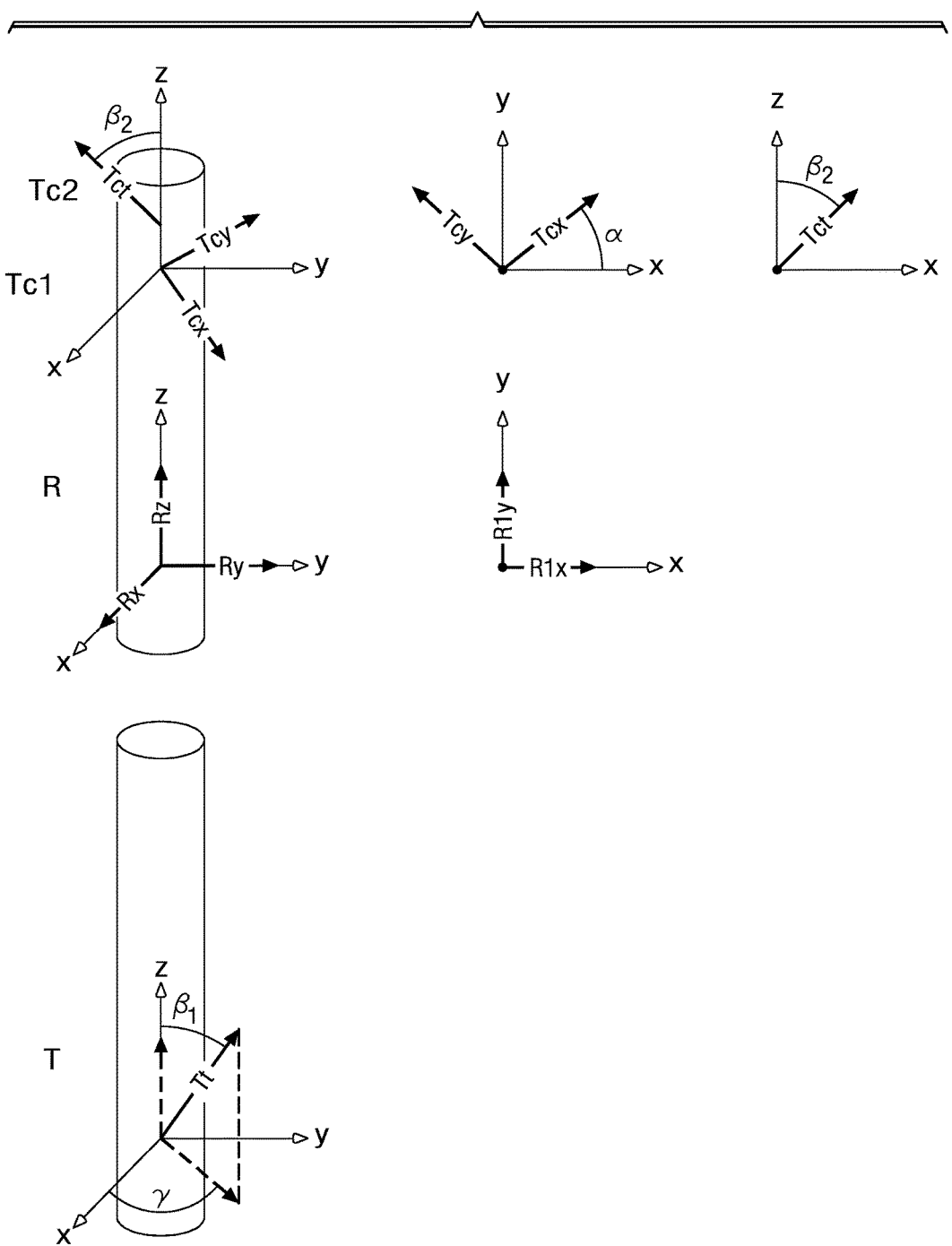
FIG. 2B schematically depicts the antenna moments in the electromagnetic logging tool shown on FIG. 2A.

FIGS. 2A and 2B (collectively FIG. 2) depict electromagnetic measurement tool embodiment 50. FIG. 2A depicts one example of an electromagnetic measurement tool 50. In the depicted embodiment measurement tool 50 includes a first transmitter 52 and a receiver 53 deployed on a first sub 51 and a second transmitter 57 deployed on a second sub 56. The first and second subs 51 and 56 may be axially spaced apart substantially any suitable distance to achieve a desired measurement depth. While not shown, other BHA tools may be deployed between subs 51 and 56. As described in more detail below, the receiver 53 includes a tri-axial antenna arrangement (e.g., three mutually orthogonal antennas including an axial antenna and first and second transverse antennas that are orthogonal to one another in this particular embodiment) and the transmitters 52 and 57 each include a tilted transmitter.

As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein). A tilted antenna is one whose moment is angularly offset (tilted) with respect to the tool axis and is neither parallel with nor orthogonal to the tool axis.

FIG. 2B depicts the antenna moments for transmitters 52 and 57 and receiver 53 on electromagnetic measurement tool 50. Receiver 53 (R) includes three collocated tri-axial antennas having mutually orthogonal moments Rx, Ry, and Rz aligned with the x-, y-, and z-directions (axes). Transmitter 52 (Tc1 and Tc2) includes first and second collocated transverse antennas Tcx and Tcy that are rotationally offset from Rx and Ry by an offset angle $\alpha$ (e.g., $\alpha=45$ degrees). Transmitter 52 further includes a tilted antenna Tct that may be axially offset from Tcx and Tcy as indicated. Antenna Tct has a tilt angle of $\beta_2$ with respect to the cross-axial plane (e.g., the x-axis). As depicted sub 56 is rotationally offset (about the axis of the drill string, the z-axis) with respect to sub 51 by a misalignment angle $\gamma$ such that the transmitter T is rotationally offset with receiver R. In the depicted embodiment, transmitter 57 (T) includes a single tilted antenna Tt having a moment that is rotationally offset about the tool axis (the z-axis) by the angle $\gamma$ with respect to the x-axis and Rx. Stated another way a projection of the tilted antenna Tt on the cross-axial plane (i.e., the x-y plane) is rotationally offset from Rx by the by the angle $\gamma$. Antenna Tt is further tilted by an angle $\beta_1$ with respect to the z-axis. While transmitter T need only include a single tilted transmitter antenna (as depicted), it will be understood that sub 51 may optionally include other transmitting and receiving antennas. The disclosed embodiments are not limited in this regard.

It will be understood that the offset angle $\alpha$ is not necessarily 45 degrees as depicted on FIG. 2B, but may be substantially any non-zero, non-ninety degree angle. An offset angle $\alpha$ in a range from about 30 to about 60 degrees is generally preferred, although by no means required. It will also be understood that the misalignment angle $\gamma$ is the result of a rotational misalignment between subs 51 and 56 during make-up of the drill string. As such the misalignment angle $\gamma$ may have substantially any value.

Figures 3A, 3B:
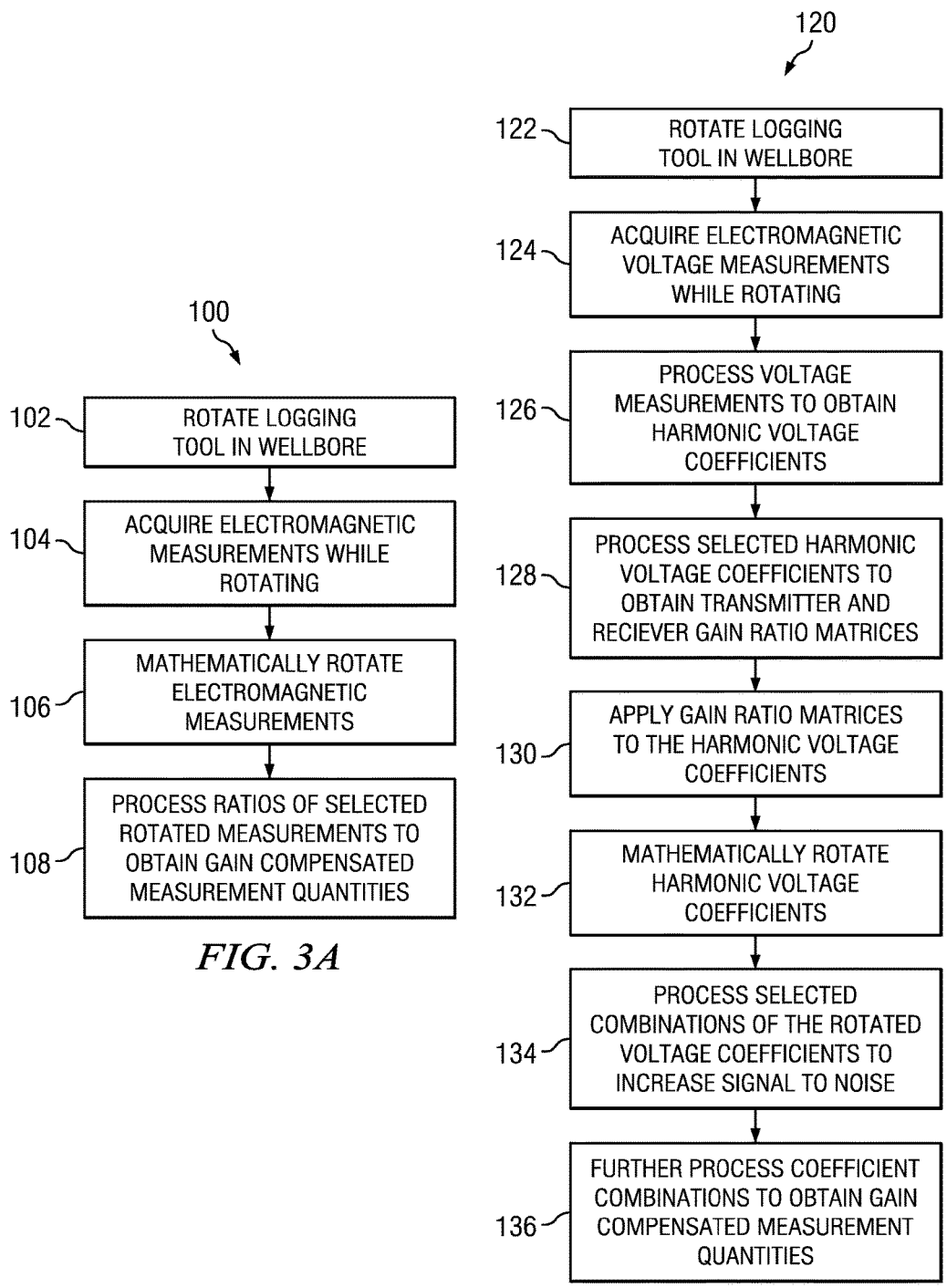
FIG. 3A depicts a flow chart of one disclosed method embodiment.
FIG. 3B depicts a flow chart of another disclosed method embodiment.

FIGS. 3A and 3B depict flow charts of example method embodiments 100 and 120 disclosed herein. In FIG. 3A an electromagnetic measurement tool (such as measurement tool 50 shown on FIG. 2) is rotated in a subterranean wellbore at 102. Electromagnetic voltage measurements are acquired at 104 while rotating. At 106 the voltage measurements may be mathematically rotated through the angle $\gamma$ (FIG. 2B). Selected ratios of the rotated measurements may then be processed to obtain gain compensated measurement quantities.

In FIG. 3B, electromagnetic voltage measurements are acquired at 124 while rotating an electromagnetic measurement tool at 122. The acquired measurements are processed at 126 to obtain corresponding harmonic voltage coefficients (e.g., the DC, first harmonic cosine, and first harmonic sine or the DC, first harmonic cosine, and first harmonic sine, second harmonic cosine, and second harmonic sine coefficients). At 128, selected ones of the harmonic voltage coefficients are processed to obtain a gain ratio of the first and second orthogonal receiver antennas (e.g., a gain ratio of the x- to y-axis antennas). The harmonic voltage coefficients may be selected, for example, so that a gain ratio matrix replaces the y antenna receiver gains with x antenna receiver gains when applied to the harmonic voltage coefficients. These gain ratio matrices may then be applied to selected harmonic voltage coefficients at 130. The harmonic voltage coefficients (with the applied gain ratio matrices) are rotated mathematically at 132 to simulate rotation of the transmitter T about the tool axis (the z-axis) by the misalignment angle $\gamma$ on the measurements. At 134, selected combinations of the rotated measurements obtained in 132 may be processed to obtain coefficient combinations and thereby increase the signal to noise ratio of the measurements. Selected ratios of these coefficient combinations may then be further processed at 136 to obtain gain compensated measurement quantities.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennas can be processed, as is known to those of ordinary skill in the art, to obtain one or more properties of the formation.

In general the earth is anisotropic such that its electrical properties may be expressed as a three-dimensional tensor which contains information on formation resistivity anisotropy, dip, bed boundaries and other aspects of formation geometry. It will be understood by those of ordinary skill in the art that the mutual couplings between tri-axial transmitter antennas and tri-axial receiver antennas depicted form a three-dimensional matrix and thus may have sensitivity to a full three-dimensional formation impedance tensor. For example, a three-dimensional matrix of measured voltages V may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the three-dimensional matrix of measured voltages, with i indicating the corresponding transmitter and j indicating the corresponding receiver, $I_i$ represent the transmitter currents, and $Z_{ij}$ represent the transfer impedances (couplings) which depend on the electrical and magnetic properties of the environment surrounding the antenna pair in addition to the frequency, geometry, and spacing of the antennas. The third and fourth subscripts indicate the axial orientation of the transmitter and receiver antennas. For example, $Z_{TRXZ}$ represents a cross-coupling impedance when a z-axis antenna of receiver R receives an electromagnetic wave from an x-axis antenna of transmitter T.

It will be understood that while it may be desirable to measure the full voltage tensor shown in Equation 1, such measurements are not always feasible or practical. Tilted antennas are commonly used in applications where it is desirable to make fewer voltage measurements yet still obtain as many tensor impedance components as possible.

With reference to FIGS. 2 and 3, when bending of the measurement tool is negligible (e.g., less than about 10 degrees), the measured voltages may be modeled mathematically, for example, as follows:

$$V_{ij} = G_i m_i^t R_\theta^t Z_{ij} R_\theta m_j G_j \quad (2)$$

where $Z_{ij}$ are matrices representing triaxial tensor couplings (impedances) between the locations of transmitter i and receiver j, $G_i$ and $G_j$ are diagonal matrices representing the transmitter and receiver gains, $R_\theta$ represents the rotation matrix about the z-axis through angle $\theta$, $m_i$ and $m_j$ represent the matrices of the direction cosines for the transmitter and receiver moments at $\theta=0$, and the superscript t represents the transpose of the corresponding matrix. The matrices in Equation 2 may be given, for example, as follows:

$$Z_{ij} = \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (3)$$

$$G_i = \begin{bmatrix} g_{ix} & 0 & 0 \\ 0 & g_{iy} & 0 \\ 0 & 0 & g_{ix} \end{bmatrix} \quad (4)$$

$$G_j = \begin{bmatrix} g_{jx} & 0 & 0 \\ 0 & g_{jy} & 0 \\ 0 & 0 & g_{jz} \end{bmatrix} \quad (5)$$

$$R_\theta = \begin{bmatrix} \cos(\theta) & -\sin(\theta) & 0 \\ \sin(\theta) & \cos(\theta) & 0 \\ 0 & 0 & 1 \end{bmatrix} \quad (6)$$

With respect to the measurement tool configuration shown on FIG. 2 and using the triaxial Rx antenna direction as a reference direction, the matrices of the direction cosines of the transmitter and receiver moments may be given, for example, as follows:

$$m_R = I = \begin{bmatrix} 1 & 0 & 0 \\ 0 & 1 & 0 \\ 0 & 0 & 1 \end{bmatrix} \quad (7)$$

$$m_T = \begin{bmatrix} \cos(\gamma)\sin(\beta_1) \\ \sin(\gamma)\sin(\beta_1) \\ \cos(\beta_1) \end{bmatrix}$$

$$m_{Tc1} = \begin{bmatrix} \cos(\alpha) & -\sin(\alpha) \\ \sin(\alpha) & \cos(\alpha) \\ 0 & 0 \end{bmatrix}$$

$$m_{Tc2} = \begin{bmatrix} \sin(\beta_2) \\ \sin(\beta_2) \\ \cos(\beta_2) \end{bmatrix}$$

where I represents the identity matrix, and $\alpha$, $\beta_1$, $\beta_2$, and $\gamma$ are defined above with respect to FIG. 2. The rotated tensor couplings (shown in Equation 2) may be expressed mathematically in harmonic form, for example, as follows:

$$R_\theta^t Z_{ij} R_\theta = Z_{DC\_ij} + Z_{FHC\_ij}\cos(\theta) + Z_{FHS\_ij}\sin(\theta) + Z_{SHC\_ij}\cos(2\theta) + Z_{SHS\_ij}\sin(2\theta) \quad (8)$$

where $Z_{DC\_ij}$ represents a DC (average) coupling coefficient, $Z_{FHC\_ij}$ and $Z_{FHS\_ij}$ represent first order harmonic cosine and first order harmonic sine coefficients (referred to herein as first harmonic cosine and first harmonic sine coefficients), and $Z_{SHC\_ij}$ and $Z_{SHS\_ij}$ represent second order harmonic cosine and second order harmonic sine coefficients (referred to herein as second harmonic cosine and second harmonic sine coefficients) of the couplings. These coefficients are shown below:

$$Z_{DC\_ij} = \begin{bmatrix} \frac{Z_{ijxx}+Z_{ijyy}}{2} & \frac{(Z_{ijxy}-Z_{ijyx})}{2} & 0 \\ -\frac{(Z_{ijxy}+Z_{ijyx})}{2} & \frac{Z_{ijxx}-Z_{ijyy}}{2} & 0 \\ 0 & 0 & Z_{ijzz} \end{bmatrix} \quad (9)$$

$$Z_{FHC\_ij} = \begin{bmatrix} 0 & 0 & Z_{ijxz} \\ 0 & 0 & Z_{ijyz} \\ Z_{ijzx} & Z_{ijzy} & 0 \end{bmatrix}$$

$$Z_{FHS\_ij} = \begin{bmatrix} 0 & 0 & Z_{ijyz} \\ 0 & 0 & -Z_{ijxz} \\ Z_{ijzy} & -Z_{ijzx} & 0 \end{bmatrix}$$

$$Z_{SHC\_ij} = \begin{bmatrix} \frac{Z_{ijxx}-Z_{ijyy}}{2} & \frac{(Z_{ijxy}+Z_{ijyx})}{2} & 0 \\ \frac{(Z_{ijxy}+Z_{ijyx})}{2} & -\frac{(Z_{ijxx}-Z_{ijyy})}{2} & 0 \\ 0 & 0 & 0 \end{bmatrix}$$

$$Z_{SHS_{ij}} = \begin{bmatrix} \frac{(Z_{ijxy}+Z_{ijyx})}{2} & -\frac{Z_{ijxx}-Z_{ijyy}}{2} & 0 \\ -\frac{(Z_{ijxx}-Z_{ijyy})}{2} & -\frac{(Z_{ijxy}+Z_{ijyx})}{2} & 0 \\ 0 & 0 & 0 \end{bmatrix}$$

As stated above, the receiver antenna voltages are measured at 124 while the tool rotates at 122 (FIG. 3B). Following the form of Equation 8, the measured voltages may be expressed mathematically in terms of their harmonic voltage coefficients, for example, as follows thereby enabling the harmonic coefficients to be obtained (e.g., at 126 in FIG. 3B):

$$V_{ij} = V_{DC\_ij} + V_{FHC\_ij}\cos(\theta) + V_{FHS\_ij}\sin(\theta) + V_{SHC\_ij}\cos(2\theta) + V_{SHS\_ij}\sin(2\theta) \quad (10)$$

In one disclosed embodiment gain compensation may be accomplished by obtaining ratios between the x and y receiver gains and the x and y transmitter gains (e.g., at 128 in FIG. 3B). The DC voltage measurements received at the x- and y-axis receivers upon firing the Tc1 transmitters may be expressed as follows:

$$V_{DC\_Tc1R} = \begin{bmatrix} V_{DC\_tc1Rxx} & V_{DC\_tc1Rxy} \\ V_{DC\_tc1Ryx} & V_{DC\_tc1Ryy} \end{bmatrix} \quad (11)$$

These voltage measurements may be expressed as a function of the couplings (impedances), gains, and the angle α, for example, as follows:

$$V_{DC\_tc1Rxx} = \quad (12)$$
$$g_{Tc1x}g_{Rx}\left[\frac{(Z_{tc1xx}+Z_{tc1yy})}{2}\cos(\alpha) + \frac{(Z_{tc1xy}-Z_{tc1yx})}{2}\sin(\alpha)\right]$$

$$V_{DC\_tc1Rxy} = g_{Tc1x}$$
$$g_{Ry}\left[\frac{(Z_{tc1xy}+Z_{tc1yx})}{2}\cos(\alpha) - \frac{(Z_{tc1xx}-Z_{tc1yy})}{2}\sin(\alpha)\right]$$

$$V_{DC\_tc1Ryx} = -g_{Tc1y}$$
$$g_{Rx}\left[\frac{(Z_{tc1xx}+Z_{tc1yy})}{2}\sin(\alpha) - \frac{(Z_{tc1xy}-Z_{tc1yx})}{2}\cos(\alpha)\right]$$

$$V_{DC\_tc1Ryy} = g_{Tc1y}g_{Ry}\left[\frac{(Z_{tc1xx}+Z_{tc1yy})}{2}\cos(\alpha) + \frac{(Z_{tc1xy}-Z_{tc1yx})}{2}\sin(\alpha)\right]$$

Taking the ratio between the DC xx and yy voltage measurements yields:

$$\frac{V_{DC\_Tc1Rxx}}{V_{DC\_Tc1Ryy}} = \frac{g_{Rx}}{g_{Ry}}\frac{g_{Tc1x}}{g_{Tc1y}} \quad (13)$$

Likewise, taking the ratio between the DC voltage xy and yx measurements yields:

$$\frac{V_{DC\_Tc1Rxy}}{V_{DC\_Tc1Ryx}} = -\frac{g_{Ry}}{g_{Rx}}\frac{g_{Tc1x}}{g_{Tc1y}} \quad (14)$$

where $g_{Rx}$ and $g_{Ry}$ represent the gains of the x and y antenna on receiver R and $g_{TC1x}$ and $g_{TC1y}$ represent the gains of the x and y antenna on transmitter Tc1. Equations 13 and 14 may be combined to obtain measured quantities that are equivalent to a gain ratio of the x and y receiver and a gain ratio of the x and y transmitter, for example, as follows:

$$gR \stackrel{def}{=} \sqrt{-\frac{V_{DC\_Tc1Rxx}}{V_{DC\_Tc1Ryy}}\frac{V_{DC\_Tc1Ryx}}{V_{DC\_Tc1Rxy}}} = \frac{g_{Rx}}{g_{Ry}} \quad (15)$$

Since the gain ratio formula in Equation 15 involves taking a square root, there may be a 180 degree phase ambiguity (i.e., a sign ambiguity). As such, the gain ratios may not be arbitrary, but should be controlled such that they are less than 180 degrees. For un-tuned receiving antennas, the electronic and antenna gain/phase mismatch (assuming the antenna wires are not flipped from one receiver to another) may generally be controlled to within about 30 degrees (particularly at the lower frequencies used for deep measurements). This is well within 180 degrees (even at elevated temperatures where the mismatch may be at its greatest). For tuned transmitting antennas, however, the phase may change signs (i.e., jump by 180 degrees) if the drift in the antenna tuning moves across the tuning resonance. Such transmitter phase ratio ambiguity (sign ambiguity) may be resolved, for example, using Equations 15 and 16 and the knowledge that the receiver gain/phase ratio is not arbitrary, but limited to about 30 degrees (i.e. to enable the determination of whether the transmitter phase difference is closer to 0 or 180 degrees).

The x and y gain ratios defined in Equation 15 enable the following gain ratio matrices to be defined (e.g., at 128 in FIG. 3B):

$$G_{R\_ratio} \stackrel{def}{=} \begin{bmatrix} 1 & 0 & 0 \\ 0 & gR1 & 0 \\ 0 & 0 & 1 \end{bmatrix} = \begin{bmatrix} 1 & 0 & 0 \\ 0 & \frac{g_{R1x}}{g_{R1y}} & 0 \\ 0 & 0 & 1 \end{bmatrix} \quad (16)$$

where $G_{R\_ratio}$ represents the gain ratio matrix for the receiver R. A similar ratio may be obtained for the transmitter Tc1 if so desired.

Applying this gain ratio to the measured voltage harmonics enables the y receiver gains to be replaced by x receiver gains (e.g., at 130 in FIG. 3B). This process may be represented mathematically, for example, as follows:

$$V_{DC\_TR\_gr} \stackrel{def}{=} V_{DC\_TR}G_{R\_ratio} \quad (17)$$

where $V_{DC\_TR\_gr}$ represent the DC voltage coefficients between the tilted transmitter T and the triaxial receiver R with the applied gain ratio.

From Equation 17, the DC couplings $V_{DC\_TRx\_gr}$, $V_{DC\_TRy\_gr}$, and $V_{DC\_TRz\_gr}$ may be expressed, for example, as follows:

$$V_{DC\_TRx\_gr} = \quad (18)$$
$$g_Tg_{Rx}\sin(\beta_1)\left(\frac{(Z_{TRxx}+Z_{TRyy})}{2}\cos(\gamma) - \frac{(Z_{TRxy}-Z_{TRyx})}{2}\sin(\gamma)\right)$$

$$V_{DC\_TRy\_gr} = g_Tg_{Rx}\sin(\beta_1)$$
$$\left(\frac{(Z_{TRxy}+Z_{TRyx})}{2}\cos(\gamma) - \frac{(Z_{TRxx}-Z_{TRyy})}{2}\sin(\gamma)\right)$$

$$V_{DC\_TRz} = g_Tg_{Rz}\cos(\beta_1)Z_{TRzz}$$

Note that the x- and y-axis receiver measurements are dependent on the misalignment angle γ. Couplings related to the xx+yy and the xy−yx couplings may be obtained by mathematically rotating the x- and y-axis receiver measurements (e.g., at 132 in FIG. 3B) to simulate rotation of the transmitter T such that it is rotationally aligned with the x-axis antenna in the receiver R. Such rotation by $\gamma_m$ (the measured misalignment angle) removes the effect of the misalignment angle γ on the measurements. The rotated measurements may then be combined, for example, as follows:

$$XXplusYY \stackrel{def}{=} 2(V_{DC\_TRx\_gr}\cos(\gamma_m) + V_{DC\_TRy\_gr}\sin(\gamma_m)) \quad (19)$$
$$= g_Tg_{Rx}\sin(\beta_1)(Z_{TRxx}+Z_{TRyy})$$

$$XYminusYX \stackrel{def}{=} 2(V_{DC\_TRy\_gr}\cos(\gamma_m) + V_{DC\_TRx\_gr}\sin(\gamma_m))$$
$$= g_Tg_{Rx}\sin(\beta_1)(Z_{TRxy}+Z_{TRyx})$$

where XXplusYY represents a quantity proportional to the xx coupling plus the yy coupling and XYminusYX represents a quantity proportional to the xy coupling minus the yx coupling. A quantity proportional to the zz coupling may also be defined, for example, as follows: $ZZ = V_{DC_{TR_z}} = g_T g_{Rz} \cos(\beta_1) Z_{TRzz}$. The misalignment angle between the subs may be measured using substantially any technique. For example, the misalignment angle may be taken to be the difference between magnetic toolface angles measured at each of the subs.

The gain ratio may be similarly applied to the first harmonic cosine coefficients and the first harmonic sine coefficients, for example, as follows:

$$V_{FHC\_TR\_gr} \stackrel{def}{=} V_{FHC\_TR} G_{R\_ratio}$$

$$V_{FHS\_TR\_gr} \stackrel{def}{=} V_{FHS\_TR} G_{R\_ratio} \qquad (20)$$

where $V_{FHC\_TR\_gr}$ and $V_{FHS\_TR\_gr}$ represent the first harmonic cosine voltage coefficients and the first harmonic sine coefficients between the tilted transmitter T and the triaxial receiver R with the applied gain ratio and where:

$$V_{FHC\_TRx\_gr} = g_T g_{Rx} \cos(\beta_1) Z_{TRzx}$$

$$V_{FHC\_TRy\_gr} = g_T g_{Rx} \cos(\beta_1) Z_{TRzy}$$

$$V_{FHC\_TRz} = g_T g_{Rz} \sin(\beta_1)(Z_{TRxz} \cos(\gamma) + Z_{TRyz} \sin(\gamma)) \qquad (21)$$

and $$V_{FHS\_TRx\_gr} = g_T g_{Rx} \cos(\beta_1) Z_{TRzy}$$

$$V_{FHS\_TRy\_gr} = -g_T g_{Rx} \cos(\beta_1) Z_{TRzx}$$

$$V_{FHS\_TRz} = g_T g_{Rz} \sin(\beta_1)(Z_{TRyz} \cos(\gamma) - Z_{TRxz} \sin(\gamma)) \qquad (22)$$

Note that the z-axis receiver measurements are dependent on the misalignment angle $\gamma$. Selected first harmonic cosine and first harmonic sine measurements from Equations 20 and 21 may be combined to obtain zx, zy, xz, and yz couplings. The zx and zy couplings may be obtained, for example, as follows:

$$ZX \stackrel{def}{=} \frac{V_{FHC\_TRx\_gr} - V_{FHS\_TRy\_gr}}{2} = g_T g_{Rx} \cos(\beta_1) Z_{TRzx} \qquad (23)$$

$$ZY \stackrel{def}{=} \frac{V_{FHC\_TRy\_gr} + V_{FHS\_TRx\_gr}}{2} = g_T g_{Rx} \cos(\beta_1) Z_{TRzy}$$

where ZX and ZY represent the quantities proportional to the zx and zy couplings. Quantities related to the xz and yz couplings may be obtained by mathematically rotating the measurements (e.g., at 132 in FIG. 3B) to simulate rotation of the transmitter T such that it is rotationally aligned with the x-axis antenna in the receiver R. Such rotation removes the effect of the misalignment angle $\gamma$ on the measurements. The quantities related to the xz and yz couplings may be obtained, for example, as follows:

$$XZ \stackrel{def}{=} V_{FHC\_TRz} \cos(\gamma_m) - V_{FHS\_TRz} \sin(\gamma_m) = g_T g_{Rz} \sin(\beta_1) Z_{TRxz}$$

$$YZ \stackrel{def}{=} V_{FHC\_TRz} \sin(\gamma_m) + V_{FHS\_TRz} \cos(\gamma_m) = g_T g_{Rz} \sin(\beta_1) Z_{TRyz} \qquad (24)$$

where XZ and YZ represent the xz and yz couplings and $\gamma_m$ represents the measured misalignment angle.

The gain ratio may be similarly applied to the second harmonic cosine coefficients and the second harmonic sine coefficients, for example, as follows:

$$V_{SHC\_TR\_gr} \stackrel{def}{=} V_{SHC\_TR} G_{R\_ratio}$$

$$V_{SHS\_TR\_gr} \stackrel{def}{=} V_{SHS\_TR} G_{R\_ratio} \qquad (24)$$

where $V_{SHC\_TR\_gr}$ and $V_{SHS\_TR\_gr}$ represent the second harmonic cosine voltage coefficients and the second harmonic sine coefficients between the tilted transmitter T and the triaxial receiver R with the applied gain ratio and where:

$$V_{SHC\_TRx\_gr} = \qquad (25)$$
$$g_T g_{Rx} \sin(\beta_1) \left( \frac{(Z_{TRxx} + Z_{TRyy})}{2} \cos(\gamma) + \frac{(Z_{TRxy} - Z_{TRyx})}{2} \sin(\gamma) \right)$$

$$V_{SHC\_TRy\_gr} = g_T g_{Rx} \sin(\beta_1)$$
$$\left( \frac{(Z_{TRxy} + Z_{TRyx})}{2} \cos(\gamma) - \frac{(Z_{TRxx} - Z_{TRyy})}{2} \sin(\gamma) \right)$$

and $$V_{SHS\_TRx\_gr} = \qquad (26)$$
$$g_T g_{Rx} \sin(\beta_1) \left( \frac{(Z_{TRxy} + Z_{TRyx})}{2} \cos(\gamma) - \frac{(Z_{TRxx} - Z_{TRyy})}{2} \sin(\gamma) \right)$$

$$V_{SHS\_TRy\_gr} = g_T g_{Rx} \sin(\beta_1)$$
$$\left( -\frac{(Z_{TRxx} + Z_{TRyy})}{2} \cos(\gamma) - \frac{(Z_{TRxy} - Z_{TRyx})}{2} \sin(\gamma) \right)$$

Note that the x- and y-axis receiver measurements are dependent on the misalignment angle $\gamma$. The second harmonic z-axis receiver measurements are equal to zero. Couplings related to the xx−yy and the xy+yx couplings may be obtained by mathematically rotating the x- and y-axis receiver measurements (e.g., at 132 in FIG. 3B and as described above with respect to the DC coefficients) and combining, for example, as follows $$XXminusYY = (V_{SHC\_TRx\_gr} \cos(\gamma_m) - V_{SHS\_TRx\_gr} \sin(\gamma_m)) - \qquad (27)$$
$$(V_{SHC\_TRy\_gr} \sin(\gamma_m) + V_{SHS\_TRy\_gr} \cos(\gamma_m))$$
$$= g_T g_{Rx} \sin(\beta_1)(Z_{TRxx} - Z_{TRyy})$$

$$XYplusYX = (V_{SHC\_TRx\_gr} \sin(\gamma_m) + V_{SHS\_TRx\_gr} \cos(\gamma_m)) +$$
$$(V_{SHC\_TRy\_gr} \cos(\gamma_m) - V_{SHS\_TRy\_gr} \sin(\gamma_m))$$
$$= g_T g_{Rx} \sin(\beta_1)(Z_{TRxy} - Z_{TRyx})$$

where XXminusYY represents a quantity proportional to the xx coupling minus the yy coupling and XYplusYX represents a quantity proportional to the xy coupling plus the yx coupling.

Selected ones of the above described quantities (e.g., in Equations 17-27) may be combined to obtain various gain compensated measurements quantities. For example, quantities that are equivalent to the zx, zy, xz, and yz couplings may be obtained as follows:

$$CZX \stackrel{def}{=} \frac{ZX}{XXplusYY} = \frac{Z_{TRzx} \cot(\beta_1)}{(Z_{TRxx} + Z_{TRyy})} \qquad (28)$$

$$CZY \stackrel{def}{=} \frac{ZY}{XXplusYY} = \frac{Z_{TRzy} \cot(\beta_1)}{(Z_{TRxx} + Z_{TRyy})}$$

$$CXZ \stackrel{def}{=} \frac{XZ}{ZZ} = \frac{Z_{TRxz} \tan(\beta_1)}{Z_{TRzz}}$$

$$CYZ \stackrel{def}{=} \frac{YZ}{ZZ} = \frac{Z_{TRyz} \tan(\beta_1)}{Z_{TRzz}}$$

where CZX, CZY, CXZ, and CYZ represent the gain compensated zx, zy, xz, and yz couplings. Since each of these quantities is a function of the transmitter tilt angle $\beta_1$, it may be advantageous to include the tilt angle as an input parameter in the forward modeling. Also note that the zx and zy couplings make use of different normalization than the xz and yz couplings ($Z_{TRxx}+Z_{TRyy}$ vs. $Z_{TRzz}$). Hence, symmetrized and anti-symmetrized combinations have not been formed (e.g., following U.S. Pat. Nos. 6,969,994 and 7,536, 261).

Gain compensated quantities equivalent to xy+yx, xy−yx, and xx−yy couplings may also be obtained, for example, as follows:

$$CXYplusYX \stackrel{def}{=} \frac{XYplusYX}{XXplusYY} = \left[\frac{Z_{TRxy} + Z_{TRyx}}{(Z_{TRxx} + Z_{TRyy})}\right] \quad (29)$$

$$CXYminusYX \stackrel{def}{=} \frac{XYminusYX}{XXplusYY} = \left[\frac{Z_{TRxy} - Z_{TRyx}}{(Z_{TRxx} + Z_{TRyy})}\right]$$

$$CXXminusYY \stackrel{def}{=} \frac{XXminusYY}{XXplusYY} = \left[\frac{Z_{TRxx} - Z_{TRyy}}{(Z_{TRxx} + Z_{TRyy})}\right]$$

where CXYplusYX, CXYminusYX, and CXXminusYY represent the gain compensated xy+yx, xy−yx, and xx−yy couplings.

A gain compensated quantity equivalent to the ratio of the xx to yy couplings may also be obtained, for example, as follows:

$$CXXdivYY \stackrel{def}{=} \frac{XXplusYY + XXminusYY}{XXplusYY - XXminusYY} = \frac{Z_{TRxx}}{Z_{TRyy}} \quad (30)$$

where CXXdivYY represents the gain compensated quantity equivalent to the ratio of the xx to yy couplings.

A gain compensated quantity may also be formed by combining the DC coefficients obtained using the both the tilted transmitter T and the tilted transmitter Tc2, for example, as follows:

$$CUHR \stackrel{def}{=} \frac{ZZ}{XXplusYY} \quad (31)$$

$$\frac{V_{DC\_Tc2Rx}}{V_{DC\_Tc2Rz}} = \left[\frac{Z_{TRzz}}{(Z_{TRxx} + Z_{TRyy})}\right]\left[\frac{(Z_{Tc2Rxx} + Z_{Tc2Ryy})}{Z_{Tc2Rzz}}\right]\frac{\tan(\beta_2)}{\tan(\beta_1)}$$

where CUHR represents the gain compensated quantity. Equations 30 and 31 advantageously provide fully gain compensated quantities (CXXdivYY and CUHR) similar to the uncompensated resistivity anisotropy and resistivity harmonic quantities disclosed U.S. Patent Publication 2011/0238312. The CUHR quantity is both fully gain compensated and tends to be less sensitive to variations in the tilt angle of the antennas (especially when $\beta_1=\beta_2$) as compared to the prior art resistivity harmonic quantity.

A phase shift and attenuation may be computed for the compensated quantities listed above. Quantities related to the xx, yy, and zz couplings are generally never zero and thus the phase shift and attenuation may be computed, for example, as follows:

$$PS = \frac{180}{\pi} \text{angle}(CQ) \quad (32)$$

$$AT = 20\log 10(CQ)$$

where PS represents the phase shift, AT represents attenuation, and CQ represents the compensated quantity (e.g., one of the quantities computed in Equations 30 and 31). Compensated quantities related to the cross terms (e.g., the xy, yx, xz, zx, yz, and zy couplings) may sometimes be equal to zero in simple formations (e.g., homogeneous formations not having boundary layers). For these quantities (e.g., those listed in Equations 28 and 29), the phase shift and attenuation may be computed by adding one to CQ, for example, as follows:

$$PS = \frac{180}{\pi} \text{angle}(1 + CQ) \quad (33)$$

$$AT = 20\log 10(1 + CQ)$$

It will be understood that the various methods disclosed herein for obtaining fully gain compensated electromagnetic measurement quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the fully compensated measurement quantities may be stored in downhole memory and/or transmitted to the surface while drilling via known telemetry techniques (e.g., mud pulse telemetry or wired drill pipe). Alternatively, the harmonic fitting coefficients may be transmitted uphole and the compensated quantities may be computed at the surface using a surface processor. Whether transmitted to the surface or computed at the surface, the quantity may be utilized in an inversion process (along with a formation model) to obtain various formation parameters as described above.

Although deep reading electromagnetic logging while drilling tools have been described in detail, it should be understood that various changes, substitutions and alternations can be made herein without departing from the spirit and scope of the disclosure as defined by the appended claims.

What is claimed is:

1. An electromagnetic logging while drilling tool comprising:
    first and second logging while drilling subs having corresponding first and second longitudinal axes,
    the first sub including a first transmitter and a receiver axially spaced apart from one another;
    the receiver including first, second, and third collocated receiving antennas having mutually orthogonal moments, the first receiving antenna being an axial antenna and the second and third receiving antennas being transverse antennas;
    the first transmitter including first, second, and third transmitting antennas, the first transmitting antenna being a tilted antenna, the second and third transmitting antennas being collocated transverse antennas and having corresponding moments that are orthogonal to one another and rotationally offset by a predefined angle about the first longitudinal axis from the moments of the second and third receiving antennas;
    the second sub including a titled transmitting antenna;
    the first and second subs are rotationally offset from one another by an arbitrary angle such that a projection of the tilted transmitting antenna on a cross-axial plane is rotationally offset from the second receiving antenna by the arbitrary angle; and a downhole processor configured to (i) acquire voltage measurements from the first, second, and third receiving antenna when the transmitting antennas fire and (ii) process ratios of selected ones of the voltage measurements to obtain gain compensated measurement quantities.

2. The logging tool of claim 1, wherein:
the first sub further comprises a first set of magnetometers and the second sub further comprises a second set of magnetometers; and
the logging tool further comprises a downhole processor configured to (i) acquire magnetic field measurements from the first and second sets of magnetometers and (ii) process the magnetic field measurements to compute the arbitrary angle.

3. The logging tool of claim 1, wherein the predefined angle is in a range from about 30 to about 60 degrees.

4. The logging tool of claim 1, wherein (ii) comprises:
(iia) process the voltage measurements acquired in (i) to compute harmonic coefficients; and
(iib) process ratios of selected ones of the harmonic coefficients to compute the gain compensated measurement quantities.

5. The logging tool of claim 1, wherein (ii) comprises:
(iia) process the voltage measurements acquired in (i) to compute harmonic coefficients;
(iib) process selected ones of the harmonic coefficients computed in (iia) to obtain a receiver gain matrix;
(iic) apply the gain matrix to selected ones of the harmonic coefficients;
(iid) mathematically rotate the harmonic coefficients through the arbitrary angle to obtain rotated coefficients;
(iie) process combinations of the rotated coefficients to obtain rotated combinations; and
(iif) process ratios of selected ones of the rotated combinations to obtain the gain compensated measurement quantities.

6. A method for making downhole electromagnetic logging while drilling measurements, the method comprising
(a) rotating an electromagnetic logging while drilling tool in a subterranean wellbore, the logging tool including first and second transmitters and a receiver axially spaced apart from one another, the receiver including an axial receiving antenna and first and second transverse receiving antennas, the first transmitter including a tilted antenna, and the second transmitter including a tilted antenna and first and second transverse transmitting antennas, the first and second transverse transmitting antennas being rotationally offset by a predefined angle from the first and second transverse receiving antennas, a projection of the tilted antenna in the first transmitter on a cross-axial plane being rotationally offset by an arbitrary angle from the first transverse receiving antenna;
(b) acquiring a plurality of electromagnetic voltage measurements from the receiver while the tilted transmitting antenna in the first transmitter fires while rotating in (a);
(c) mathematically rotating electromagnetic voltage measurements through at least the arbitrary angle to obtain rotated measurements; and
(d) processing ratios of selected ones of the rotated measurements to compute gain compensated measurement quantities.

7. The method of claim 6, wherein the processing in (d) is performed by a downhole processor.

8. The method of claim 7, further comprising:
(e) transmitting the gain compensated measurement quantities to a surface location; and
causing a surface computer to invert the gain compensated measurement quantities to obtain one or more properties of a subterranean formation.

9. The method of claim 6, further comprising:
(e) processing the gain compensated measurement quantities to compute compensated phase shift and attenuation quantities.

10. The method of claim 6, wherein (c) further comprises processing magnetic field measurements made at first and second axially spaced locations in the logging while drilling tool to compute the arbitrary angle.

11. The method of claim 6, wherein the gain compensated measurement quantities computed in (e) comprise at least one measurement proportional to a zz coupling, a zz coupling divided by an xx coupling plus a yy coupling, an xx coupling, an xx coupling divided by a yy coupling, or an xx coupling minus a yy coupling.

12. The method of claim 6, wherein the gain compensated measurement quantities computed in (d) comprise at least one measurement proportional to an xy coupling minus a yx coupling, or an xy coupling plus a yx coupling.

13. The method of claim 6, wherein the gain compensated measurement quantities computed in (d) comprise at least one measurement proportional to a zx coupling, an xz coupling, a zy coupling, or a yz coupling.

14. A method for making downhole electromagnetic logging while drilling measurements, the method comprising
(a) rotating an electromagnetic logging while drilling tool in a subterranean wellbore, the logging tool including first and second transmitters and a receiver axially spaced apart from one another, the receiver including an axial receiving antenna and first and second transverse receiving antennas, the first transmitter including a tilted antenna, and the second antenna including a tilted antenna and first and second transverse transmitting antennas, the first and second transverse transmitting antennas being rotationally offset by a predefined angle from the first and second transverse receiving antennas, a projection of the tilted antenna in the first transmitter on a cross-axial plane being rotationally offset by an arbitrary angle from the first transverse receiving antenna;
(b) acquiring a plurality of electromagnetic voltage measurements from the first and second receivers while rotating in (a);
(c) processing the voltage measurements acquired in (b) to compute harmonic coefficients;
(d) processing selected ones of the harmonic coefficients computed in (c) to obtain transmitter and receiver gain matrices;
(e) applying the gain matrices to the harmonic coefficients;
(f) mathematically rotating the harmonic coefficients through the arbitrary angle and processing combinations of the harmonic coefficients to obtain rotated combinations; and
(g) processing ratios of selected ones of the rotated combinations to obtain gain compensated measurement quantities.

15. The method of claim 14, wherein (d) and (e) further comprise:
(d) processing selected ones of a first set of the harmonic coefficients computed in (c) from voltage measurements obtained when the first and second transverse transmitting antennas fire to obtain transmitter and receiver gain matrices; and (e) applying the gain matrices to a second set of the harmonic coefficients obtained when the tilted antenna in the first transmitter fires.

16. The method of claim 14, wherein the processing in (e) is performed by a downhole processor and the method further comprises:

(h) transmitting the gain compensated measurement quantities to a surface location; and (i) causing a surface computer to invert the gain compensated measurement quantities to obtain one or more properties of a subterranean formation.

17. The method of claim 14, further comprising:

(h) processing the gain compensated measurement quantities to compute compensated phase shift and attenuation quantities.

18. The method of claim 14, wherein the harmonic coefficients computed in (c) comprise, DC coefficients, first harmonic cosine, first harmonic sine, second harmonic cosine, and second harmonic sine coefficients.

19. The method of claim 14, wherein the gain compensated measurement quantities computed in (e) comprise at least one measurement proportional to a zz coupling, a zz coupling divided by an xx coupling plus a yy coupling, an xx coupling, an xx coupling divided by a yy coupling, or an xx coupling minus a yy coupling.

20. The method of claim 14, wherein the gain compensated measurement quantities computed in (d) comprise at least one measurement proportional to an xy coupling minus a yx coupling, or an xy coupling plus a yx coupling.

21. The method of claim 14, wherein the gain compensated measurement quantities computed in (d) comprise at least one measurement proportional to a zx coupling, an xz coupling, a zy coupling, or a yz coupling.

* * * * *